(12) United States Patent
Yu

(10) Patent No.: US 7,003,870 B2
(45) Date of Patent: Feb. 28, 2006

(54) APPARATUS FOR INSERTING A HANDLE PART INTO A MOLD FOR BLOW MOLDING A BOTTLE

(76) Inventor: Ming-Chieh Yu, No. 87-3, Pu-Hsin Tsun, Ta-Yuan Hsiang, Tao-Yuan Hsien (TW)

(*) Notice: Subject to any disclaimer, the term of this patent is extended or adjusted under 35 U.S.C. 154(b) by 426 days.

(21) Appl. No.: 10/339,402

(22) Filed: Jan. 10, 2003

(65) Prior Publication Data

US 2004/0083603 A1    May 6, 2004

(30) Foreign Application Priority Data

Nov. 5, 2002    (TW) .............................. 91217732 U

(51) Int. Cl.
*B23P 21/00*    (2006.01)
*B21B 1/46*    (2006.01)

(52) U.S. Cl. .................. 29/774; 29/527.2; 29/801; 29/809

(58) Field of Classification Search ............... 29/527.1, 29/527.2, 801, 822, 774, 809, 739; 264/334, 264/336, 51; 425/444, 436 RM; 269/292
See application file for complete search history.

(56) References Cited

U.S. PATENT DOCUMENTS

| 4,441,878 | A | * | 4/1984 | Harry ......................... 425/534 |
| 4,694,570 | A | * | 9/1987 | Rudolph et al. ............... 29/740 |
| 4,705,311 | A | * | 11/1987 | Ragard ........................... 294/2 |
| 5,167,970 | A | * | 12/1992 | Yoshino et al. .............. 425/525 |
| 5,308,237 | A | * | 5/1994 | Kieran ........................ 425/437 |
| 5,338,503 | A | * | 8/1994 | Yanagisawa et al. ....... 264/516 |
| 6,450,795 | B1 | * | 9/2002 | Fields et al. ................. 425/182 |

* cited by examiner

*Primary Examiner*—Marc Jimenez
(74) *Attorney, Agent, or Firm*—Banner & Witcoff, Ltd.

(57) ABSTRACT

In an apparatus for inserting a handle part into a mold for blow molding a bottle, a pick-up unit includes a vertical backing plate, a clamping unit projecting substantially horizontally from the backing plate for clamping therebetween a portion of the handle part, and an ejector hole formed in the backing plate. A release unit is disposed at one side of the backing plate opposite to the clamping unit, and includes a plunger movable through the ejector hole for pushing the handle part away from the clamping unit.

13 Claims, 16 Drawing Sheets

APPARATUS FOR INSERTING A HANDLE PART INTO A MOLD FOR BLOW MOLDING A BOTTLE

CROSS-REFERENCE TO RELATED APPLICATION

This application claims priority of Taiwanese Application No. 091217732, filed on Nov. 5, 2002.

BACKGROUND OF THE INVENTION

1. Field of the Invention

The invention relates to an apparatus for inserting a handle part into a mold, more particularly to an apparatus for inserting a handle part into a mold for blow molding a bottle in a safe and efficient manner.

2. Description of the Related Art

Referring to FIG. 1, a conventional blow-molded bottle 10 has a bottle body 11 for containing liquid therein, a cap 12 for closing the bottle body 11, and a handle 13 for facilitating carrying. During manufacture, the handle 13 is inserted manually into a blow molding mold of a blow molding machine (not shown) such that the handle 13 can be coupled with the bottle body 11 during blow molding of the latter. However, manual insertion of the handle 13 into the blow molding mold poses a certain degree of danger to the operator and may result in difficult control of production efficiency.

SUMMARY OF THE INVENTION

Therefore, the main object of the present invention is to provide an apparatus for inserting a handle part into a mold for blow molding a bottle, which can enhance safety and which eases control of production efficiency.

According to the present invention, an apparatus for inserting a handle part into a mold for blow molding a bottle includes:

a pick-up unit adapted for picking up the handle part, the pick-up unit including a vertical backing plate, a clamping unit projecting substantially horizontally from the backing plate and adapted to clamp therebetween a portion of the handle part, and an ejector hole formed in the backing plate; and a release unit disposed at one side of the backing plate opposite to the clamping unit, the release unit including a plunger movable through the ejector hole so as to be adapted to push the handle part away from the clamping unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Referring to FIGS. 2 to 5, the preferred embodiment of an apparatus for inserting a handle part into a mold for blow molding a bottle is shown to include a base 20, a moving mechanism, a feed mechanism 50, a pick-up unit 80, and a release unit 90.

Figure 1:
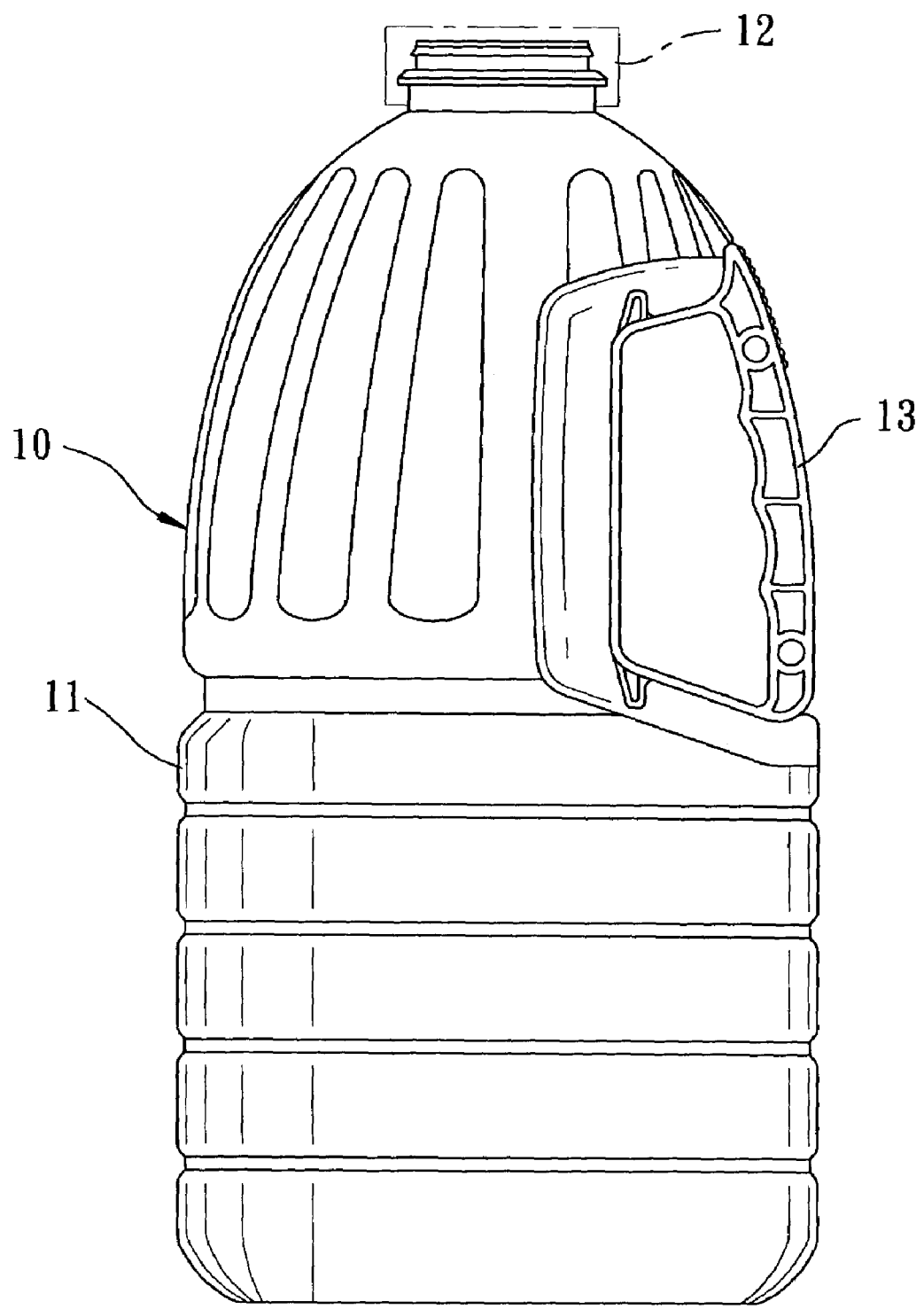
FIG. 1 is a schematic view of a conventional blow-molded bottle.
Figure 2:
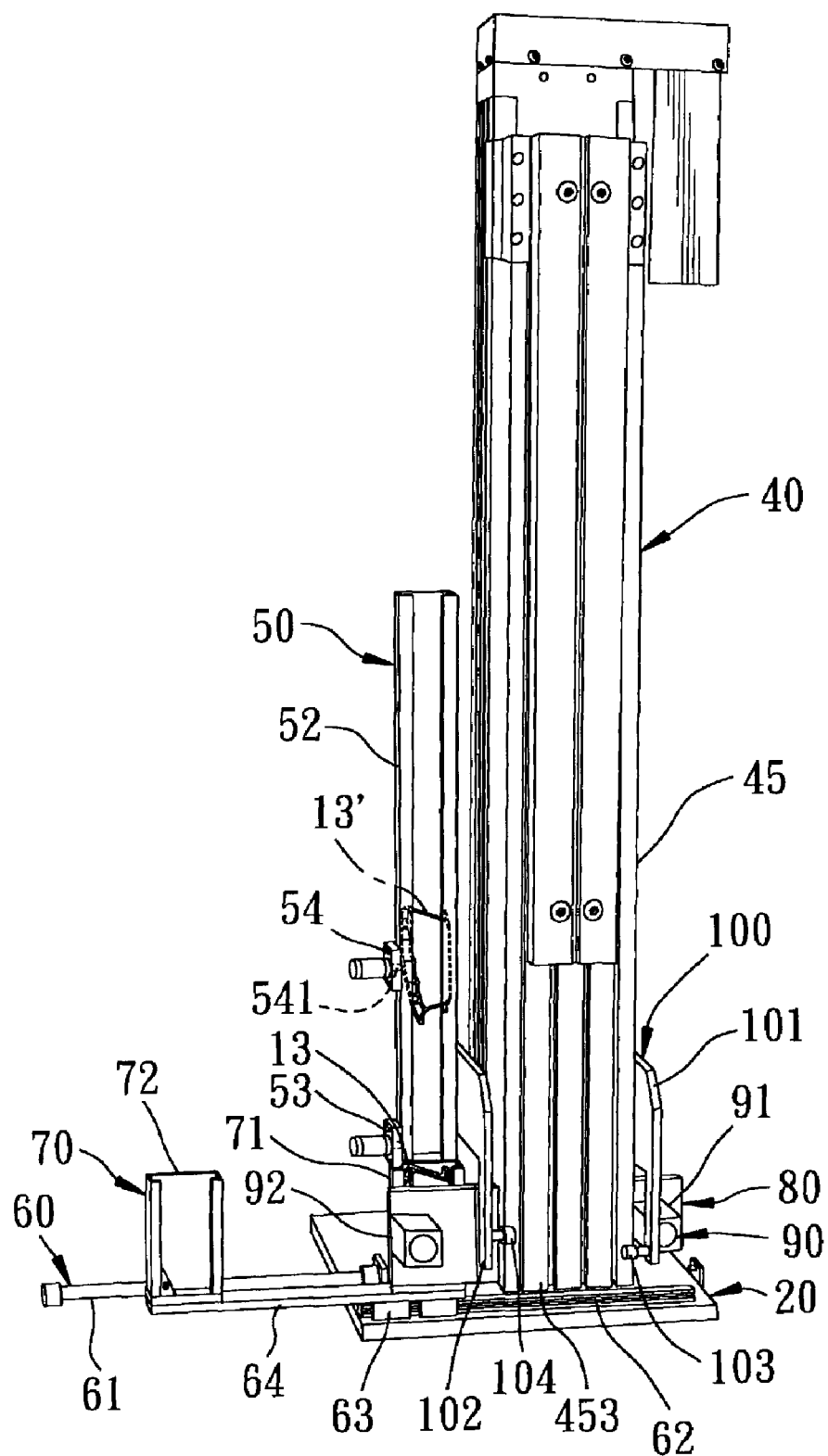
FIG. 2 is a perspective view of the preferred embodiment of an apparatus for inserting a handle part into a mold for blow molding a bottle according to the present invention.

It is noted that the reference to the relative positions of left, right, front and rear throughout the disclosure are based upon the apparatus as shown in FIG. 2.

The base 20 is a suitably sized block that is mounted on a platform of a blow molding machine (not shown).

The moving mechanism is mounted on the base 20 and is disposed to move the pick-up unit 80 toward and away from the feed mechanism 50. The moving mechanism includes a first drive unit 30 and an elevator unit 40. The first drive unit 30 is mounted on the base 20, and includes a first power source 31 and a first moving body 32 driven by the first power source 31 to move along a first horizontal direction extending through front and rear ends of the base 20. In this embodiment, the first power source 31 is a hydraulic cylinder having a piston drive rod 311 coupled to the first moving body 32. Preferably, the first drive unit 30 further includes first and second securing blocks 33, 34 secured respectively to front and rear sides of the first moving body 32, two guide rods 35 mounted between the first and second securing blocks 33, 34 and disposed in parallel to the piston drive rod 311, and two through holes 36 formed in the first moving body 32 for respective passage of the guide rods 35 therethrough so as to facilitate smooth displacement of the first moving body 32.

Figure 6:
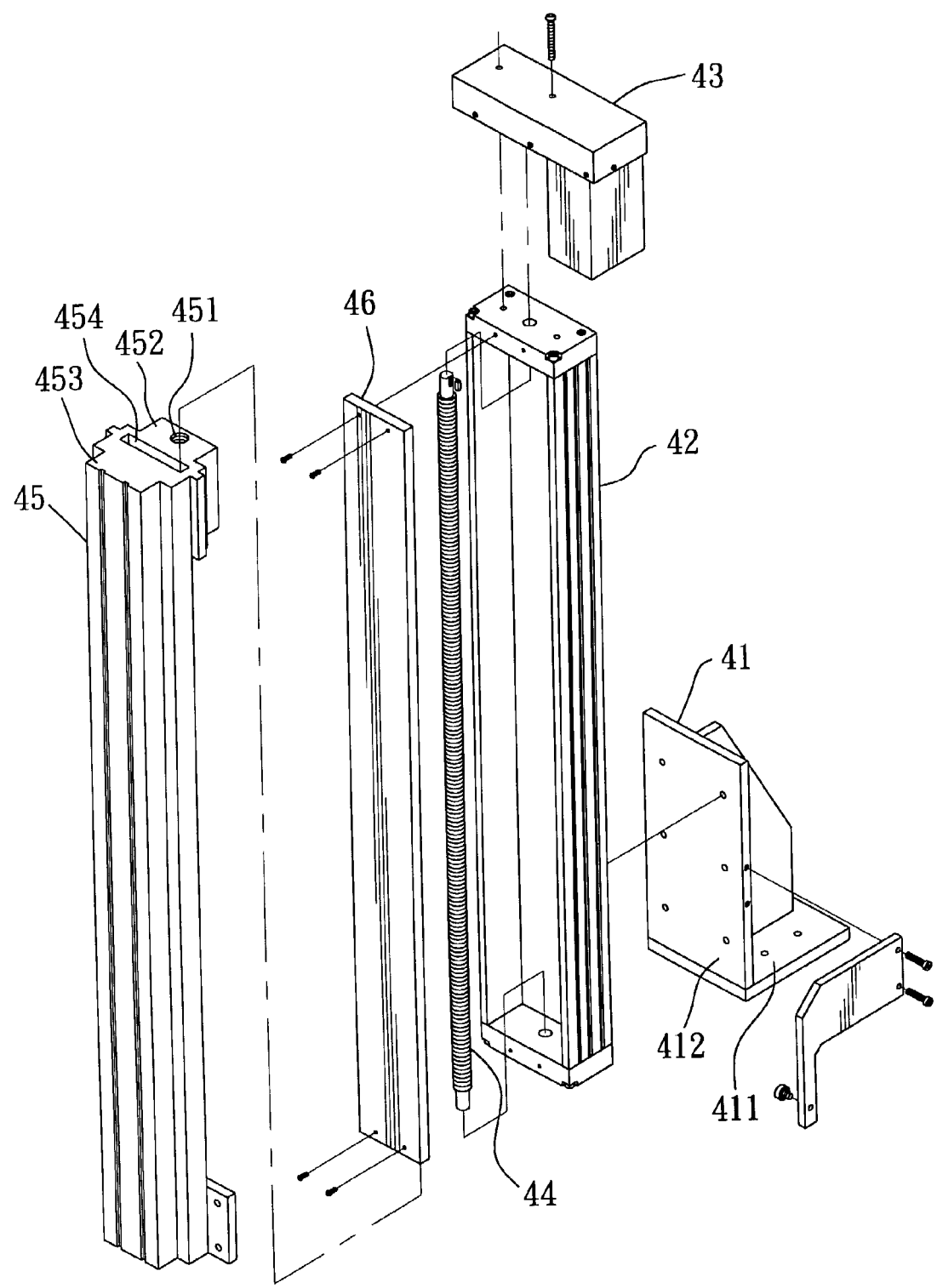
FIG. 6 is an exploded perspective view illustrating the elevator unit of the preferred embodiment.

With further reference to FIG. 6, the elevator unit 40 includes a connector 41 mounted on a top side of the first moving body 32 and having a horizontal locking plate 411 secured to the first moving body 32, and an upright locking plate 412 extending upwardly from a front end of the horizontal locking plate 411, a hollow upright support 42 connected to the upright locking plate 412 of the connector 41, an elevator seat 45 mounted movably on the upright support 42 for moving upward and downward relative to the upright support 42, a motor 43 disposed on a top end of the upright support 42, and a screw rod 44 mounted rotatably within the upright support 42 and connected to the elevator seat 45. The motor 43 is a bidirectional motor in this embodiment such that the screw rod 44 can be driven by the motor 43 to rotate in opposite directions so as to move the elevator seat 45 upwardly and downwardly. The elevator seat 45 has a connecting block 452 provided with a threaded hole 451 for threaded engagement with the screw rod 44, and a linking block 453 extending from a front end face of the connecting block 452.

Preferably, the elevator unit 40 further includes a shielding plate 46 secured to a front side of the upright support 42 so as to shield the screw rod 44 within the upright support 42. The connecting block 452 is provided with an uprightly extending slot 454 for passage of the shielding plate 46 therethrough. As such, the screw rod 44 and the connecting block 452 can be isolated from external influences to ensure smooth operation thereof.

Figure 4:
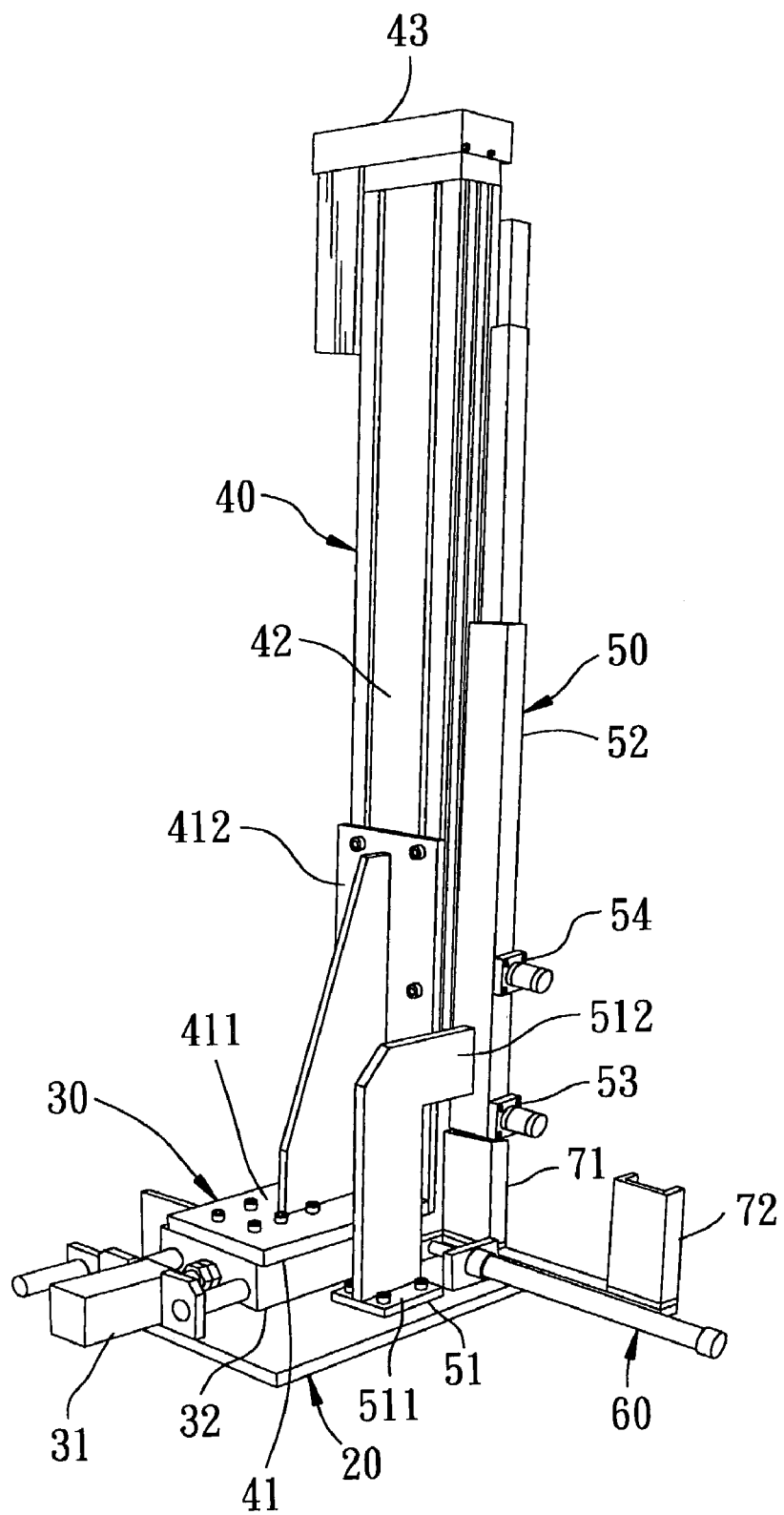
FIG. 4 is a perspective view illustrating the first drive unit, the elevator unit and a feed mechanism of the preferred embodiment.
Figure 7:
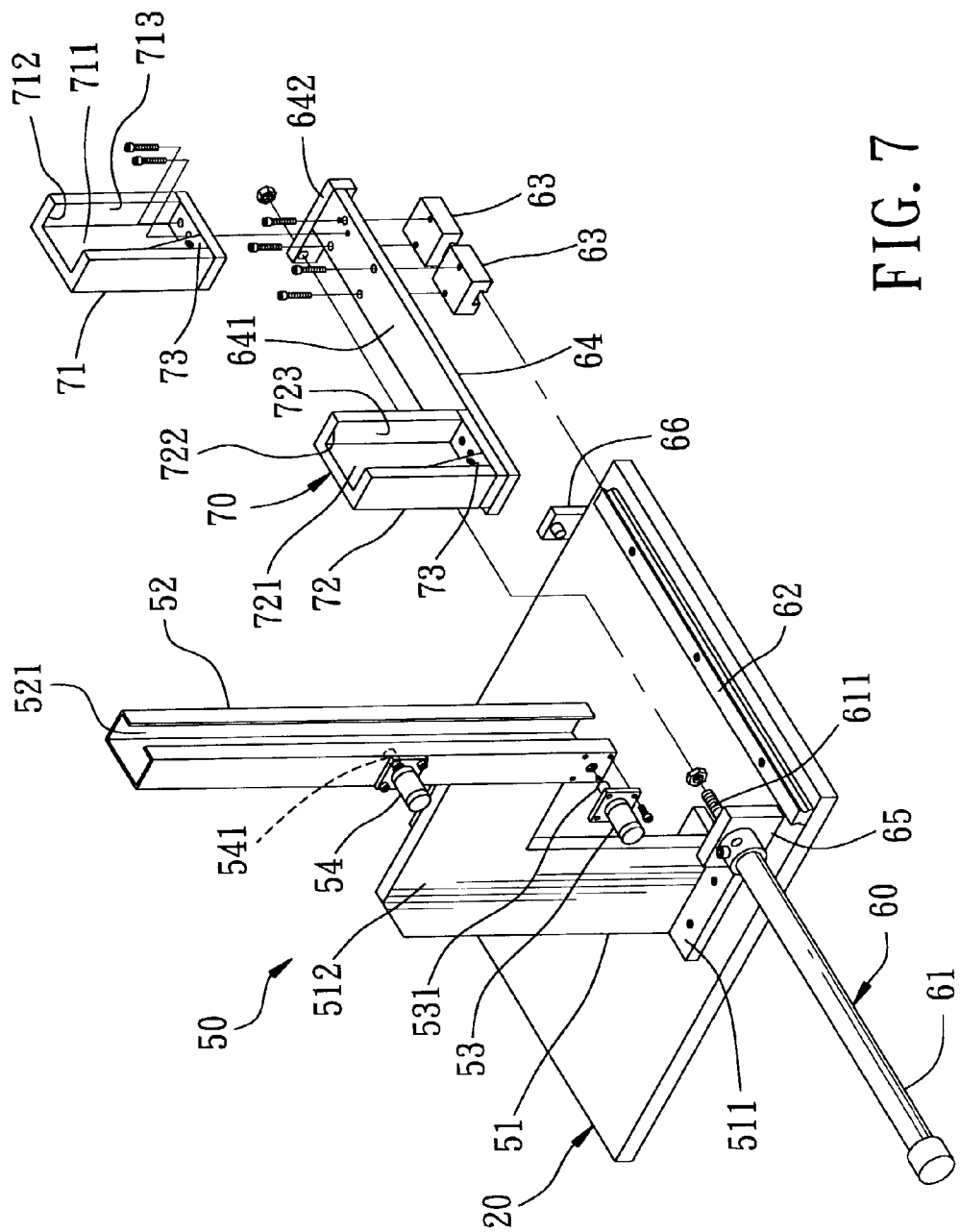
FIG. 7 is an exploded perspective view illustrating a second drive unit and the feed mechanism of the preferred embodiment

With reference to FIGS. 2, 4 and 7, the feed mechanism 50 includes a securing bracket 51, a feed frame 52, and first and second stops 53, 54. The securing bracket 51 includes a transverse plate 511 secured to the base 20, and an upright plate 512 extending uprightly and forwardly from the transverse plate 511. The feed frame 52 is mounted on the upright plate 512 of the securing bracket 51 such that the feed frame 52 is spaced apart from the base 20 in the up right direction, and defines a feed channel 521 which extends uprightly relative to the base 20 and which is adapted to receive a plurality of handle parts 13 therein and to permit the handle parts 13 to move downward therein. The handle parts 13 in this embodiment are finished products. The first and second stops 53, 54 in this embodiment are pressure cylinders that are vertically spaced apart from each other, and that respectively have piston rods 531, 541 extending across the feed channel 521 so as to control downward movement of the handle parts 13.

Referring to FIGS. 2 and 7, the feed mechanism 50 further comprises a second drive unit 60 which includes a second power source 61 mounted on the base 20, a slide rail 62 mounted on the base 20 and extending along a second horizontal direction that is perpendicular to the first horizontal direction, a plurality of slide blocks 63 slidably mounted on the slide rail 62, and a second moving body 64 connected to the plurality of slide blocks 63 and driven by the second power source 61 to move along the second horizontal direction.

In this embodiment, the second power source 61 is a hydraulic cylinder which is mounted on the base 20 by means of a securing seat 65 and which has a piston drive rod 611 that is extendible therefrom and that is retractable thereinto along the second horizontal direction. The second moving body 64 has a locking plate 641 and a linking plate 642 secured to a lateral end of the locking plate 641 and associated with the piston drive rod 611. The second moving body 64 is driven by the piston drive rod 611 to reciprocate along the second horizontal direction. Preferably, the second drive unit 60 further includes a stop 66 that is provided fixedly at a right lateral end of the base 20 and that is aligned with the linking plate 642 so as to stop the linking plate 642 and hence check travel of the second moving body 64.

A carrier 70 includes first and second feed receivers 71, 72 mounted respectively at right and left end portions of the locking plate 641 of the second moving body 64 and movable to and below the feed channel 52 so as to receive the handle parts 13 delivered from the feed channel 52. Each of the first and second feed receivers 71, 72 has a substantially U-shaped cross-section, and includes a receiving space 711, 721 to receive one of the handle parts 13 delivered from the feed channel 52, a top entrance 712, 722 to be aligned with the feed channel 52 when the feed receiver 71, 72 is moved below the feed channel 52, and a side exit opening 713, 723 to be aligned with the pick-up unit 80. The top entrance 712, 722 and the side exit opening 713, 723 are communicated with the receiving space 711, 721. Preferably, the carrier 70 further includes oblique guide blocks 73 that are respectively disposed in the first and second feed receivers 71, 72.

Figure 3:
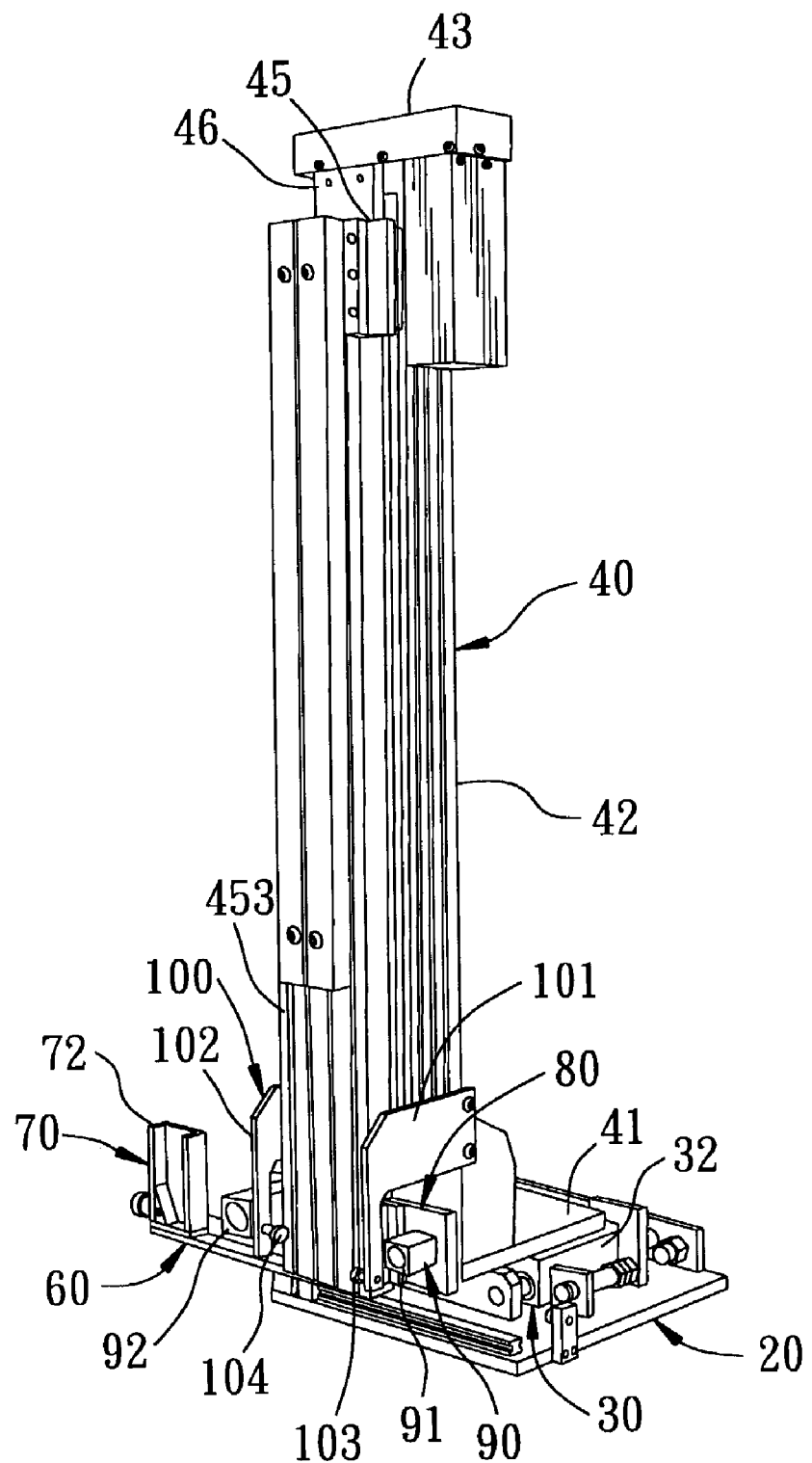
FIG. 3 is a perspective view of the preferred embodiment, illustrating a first drive unit and an elevator unit.
Figure 8:
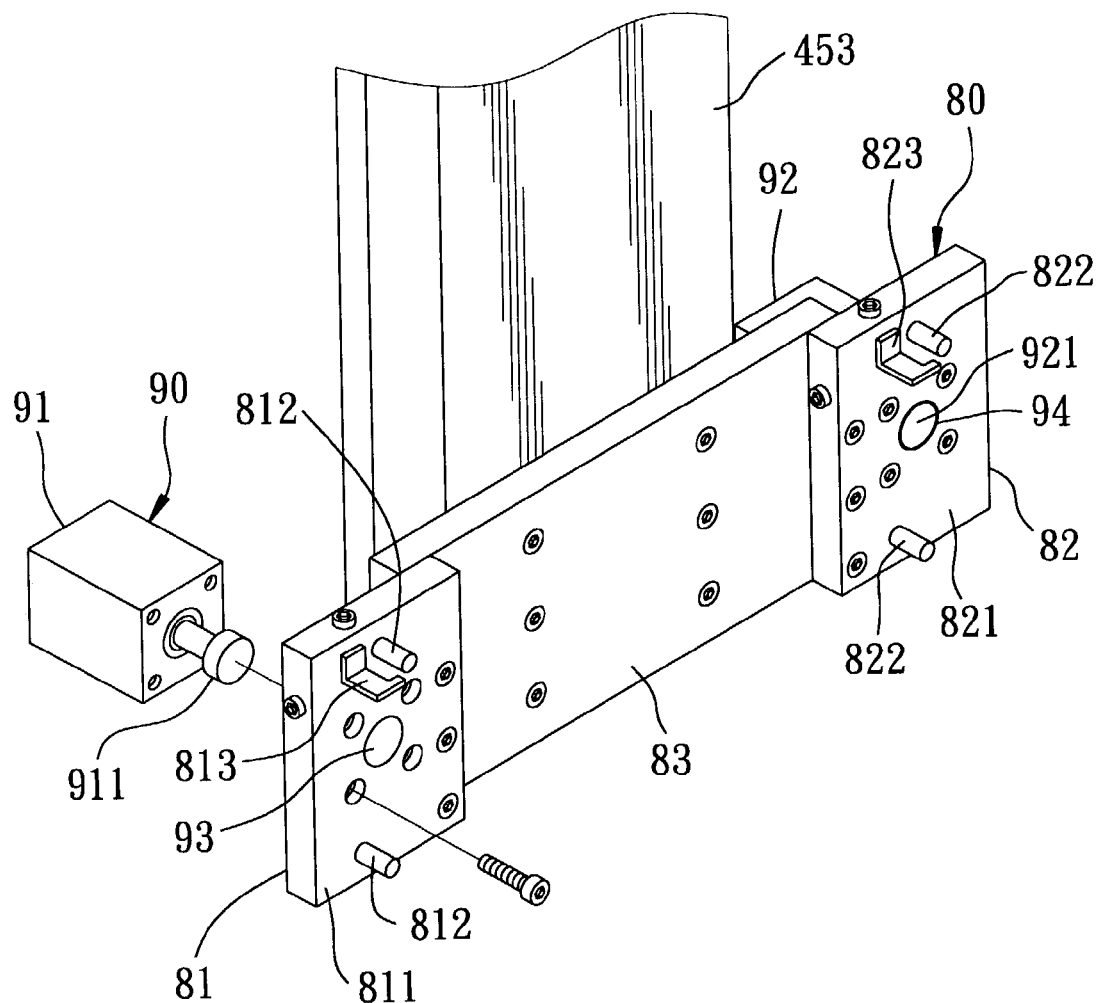
FIG. 8 is a fragmentary exploded perspective view of the preferred embodiment, illustrating a pick-up unit and a release unit.

Referring to FIGS. 2, 3 and 8, the pick-up unit 80 has a coupling block 83 secured to a bottom end of the linking block 453 of the elevator seat 45, and two pick-up elements 81, 82 secured to opposite right and left ends of the coupling block 83 and facing toward the first and second feed receivers 71, 72, respectively, such that the feed receivers 71, 72, which are mounted on the base 20 between the feed channel 52 and the pick-up unit 80, are adapted to transfer the handle parts 13 from the feed channel 52 to the pick-up unit 80. Each of the pick-up elements 81, 82 includes a vertical backing plate 811, 821 with opposite front and rear sides, a clamping unit that projects substantially horizontally from the rear side of the backing plate 811, 821 for clamping a portion of the handle part 13, and an ejector hole 93, 94 that is formed in the backing plate 811, 821. In this embodiment, the clamping unit of each of the pick-up elements 81, 82 includes upper and lower pins 812, 822 for extending through a respective one of the handle parts 13, and a clamp piece 813, 823 disposed adjacent to the upper pin 812, 822 to clamp the respective one of the handle parts 13 against the upper pin 812, 822. The ejector hole 93, 94 in each of the pick-up elements 81, 82 is disposed between the upper and lower pins 812, 822.

The release unit 90 includes first and second hydraulic cylinders 91, 92 that are respectively mounted on the front sides of the backing plates 811, 821. Each of the first and second hydraulic cylinders 91, 92 includes a plunger 911, 921 that can reciprocate through a respective one of the ejector holes 93, 94 for pushing the respective one of the handle parts 13 away from a respective one of the clamping units.

Figure 5:
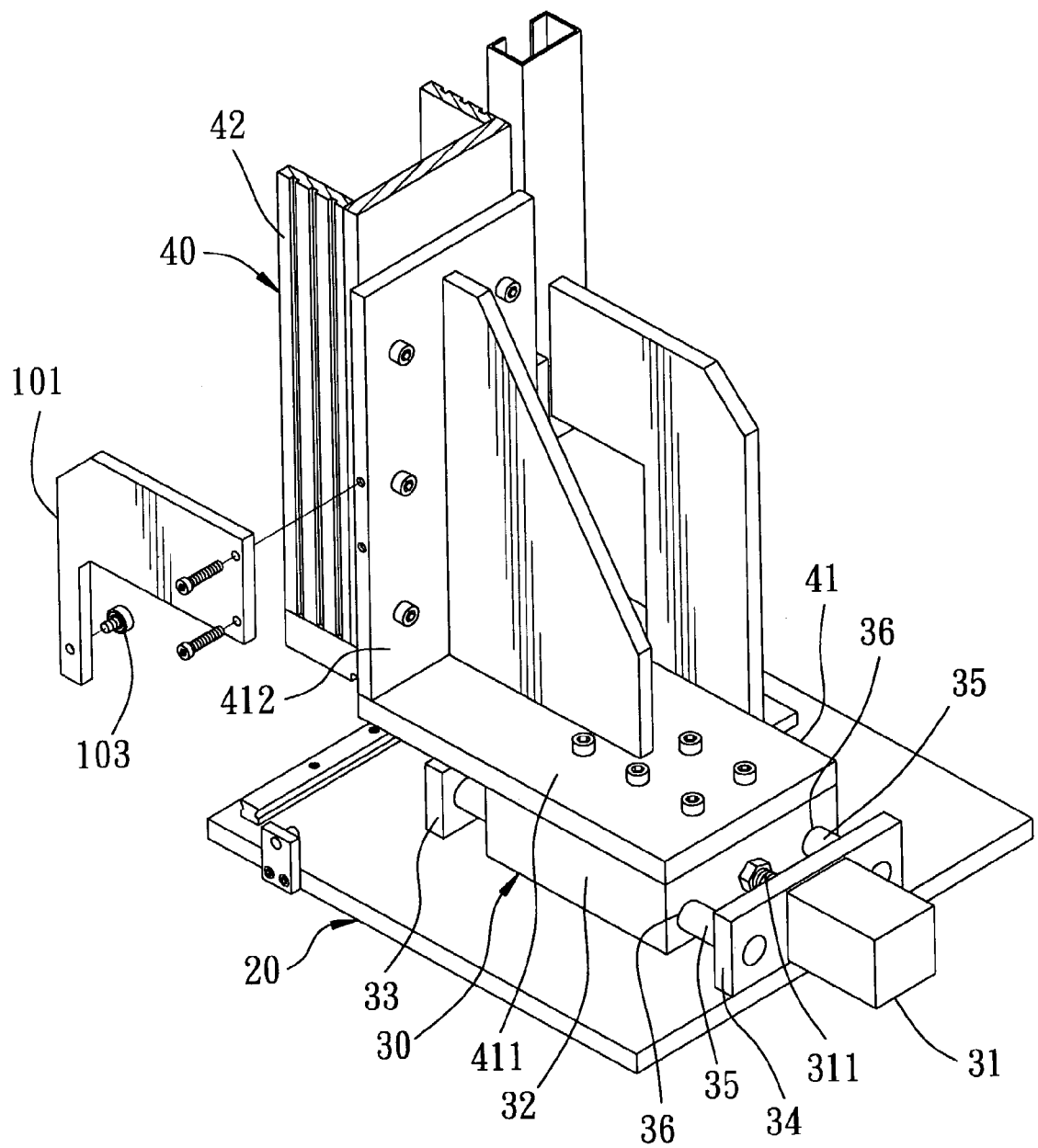
FIG. 5 is a fragmentary exploded perspective view illustrating the first drive unit and the elevator unit of the preferred embodiment.

Referring to FIGS. 2, 3 and 5, preferably, the preferred embodiment further includes a guide unit 100 which includes first and second brackets 101, 102 mounted on opposite right and left sides of the locking plate 412 of the connector 41 that is mounted on the first moving body 32 so as to be disposed on two sides of the elevator seat 45, and two guide rollers 103, 104 connected respectively to the first and second brackets 101, 102 and abutting against two sides of the linking block 453 of the elevator seat 45, thereby facilitating upward and downward movement of the elevator seat 45. Operation of the apparatus according to the present invention can be divided into four steps, as follows:

1. Feeding:

With reference to FIG. 2, at the start of the operation, the first feed receiver 71 is disposed immediately below the feed frame 52, and the piston rod 531 of the first stop 53 is in a retracted state. Thus, a bottommost one of the handle parts 13 within the feed frame 52 will automatically drop into the first feed receiver 71. The handle part 13' that is immediately above the bottommost handle part 13 will be prevented from falling by the piston rod 541 of the second stop 54. Thereafter, the piston rod 531 of the first stop 53 is extended while the piston rod 541 of the second stop 54 is retracted to permit the handle part 13' to descend to a position where it is checked by the piston rod 531.

Figure 9:
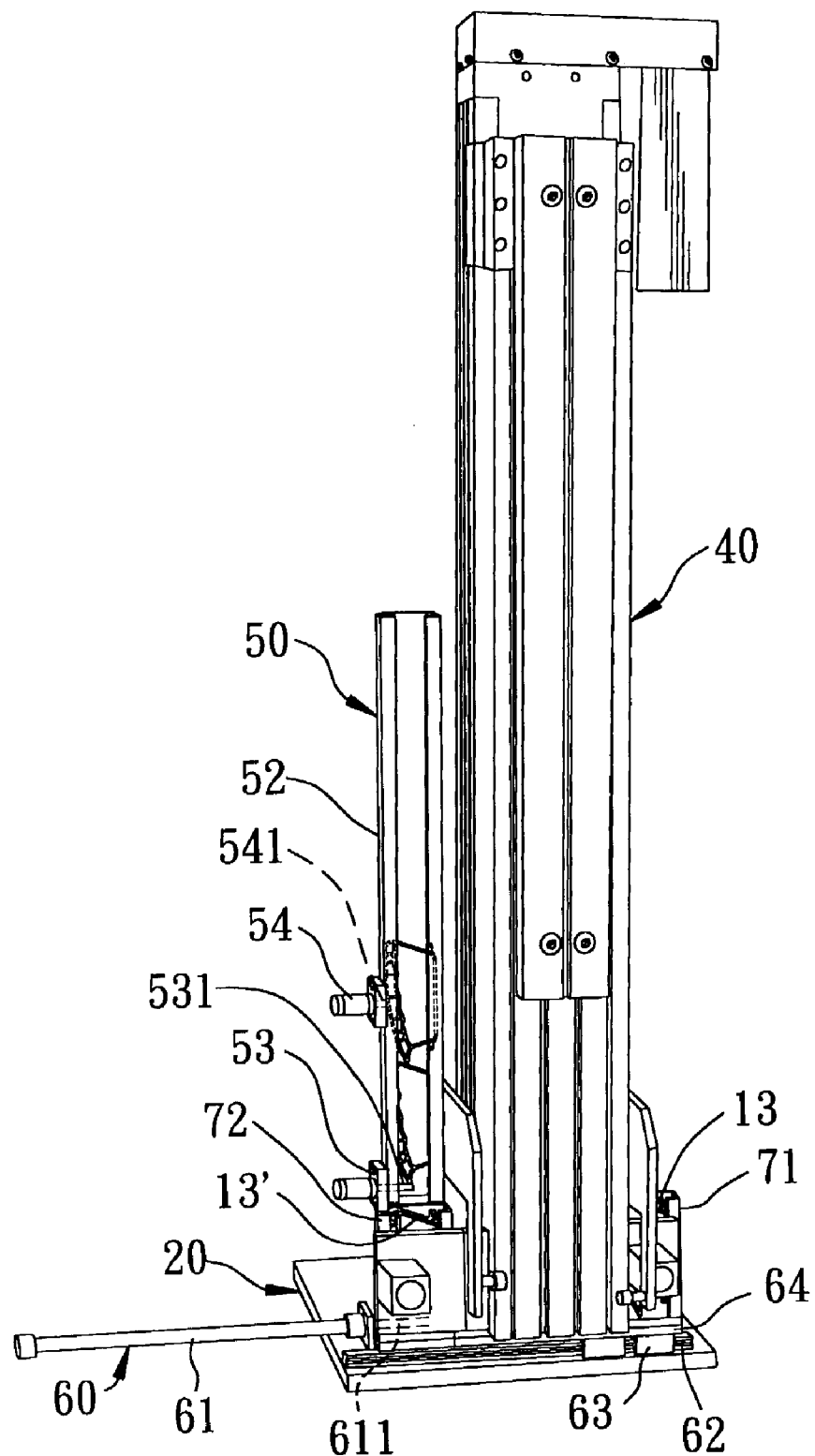
FIG. 9 is a perspective view of the preferred embodiment, illustrating falling of a handle part from a feed channel into a feed receiver.

Referring to FIG. 9, when the bottommost handle part 13 drops into the first feed receiver 71, the piston drive rod 611 of the second power source 61 brings the second moving body 64 to displace toward the right side of the base 20 so that the second feed receiver 72 is positioned immediately below the feed frame 52. Thereafter, the piston rod 531 of the first stop 53 is retracted so that the handle 13' drops into the second feed receiver 72.

It is noted that the handle parts 13, 13' can fall smoothly and respectively into the first and second feed receivers 71, 72 due to the arrangement of the oblique guide blocks 73.

Figure 10:
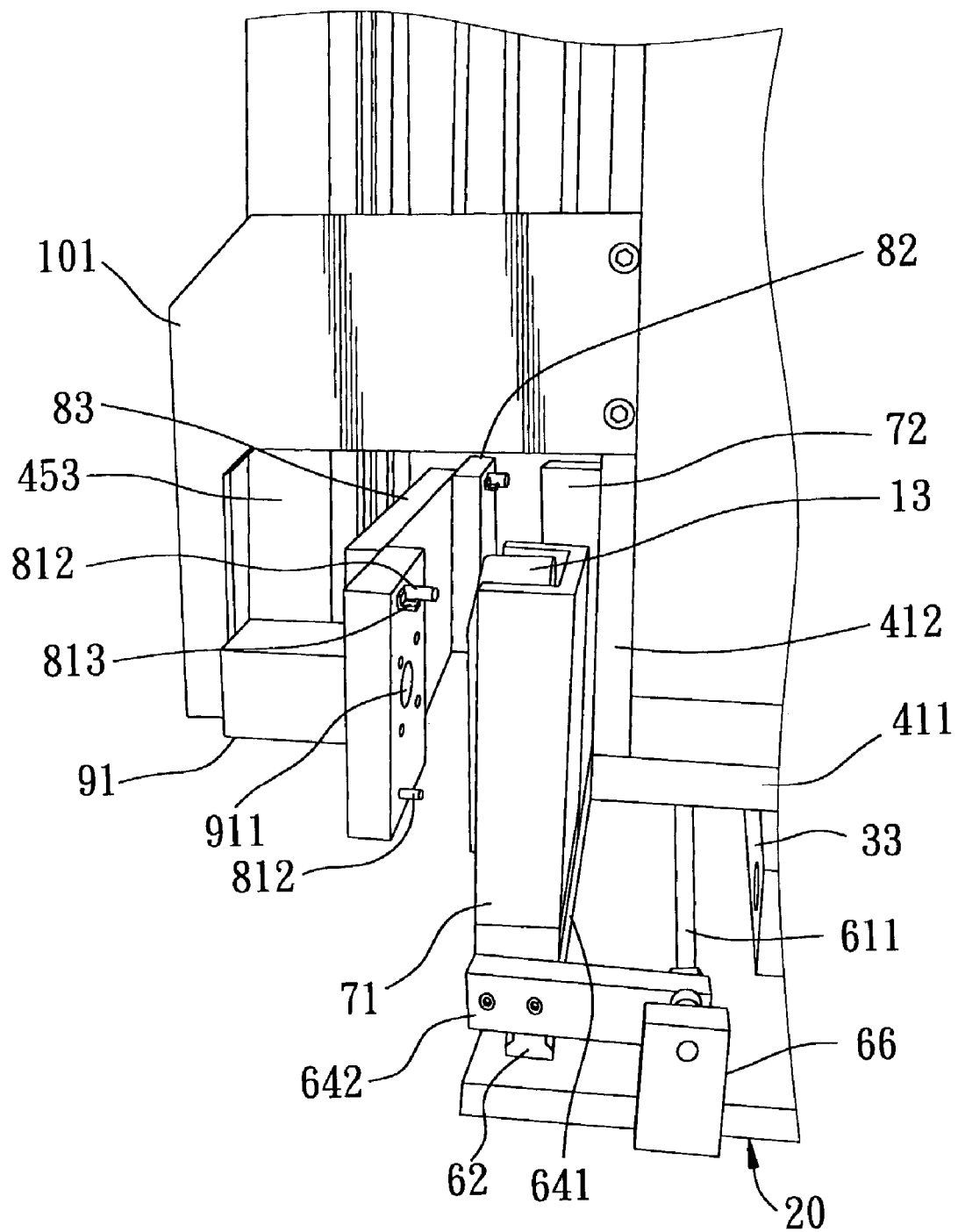
FIG. 10 is a fragmentary perspective view illustrating the pick-up unit in a state prior to picking up of the handle part.
Figure 11:
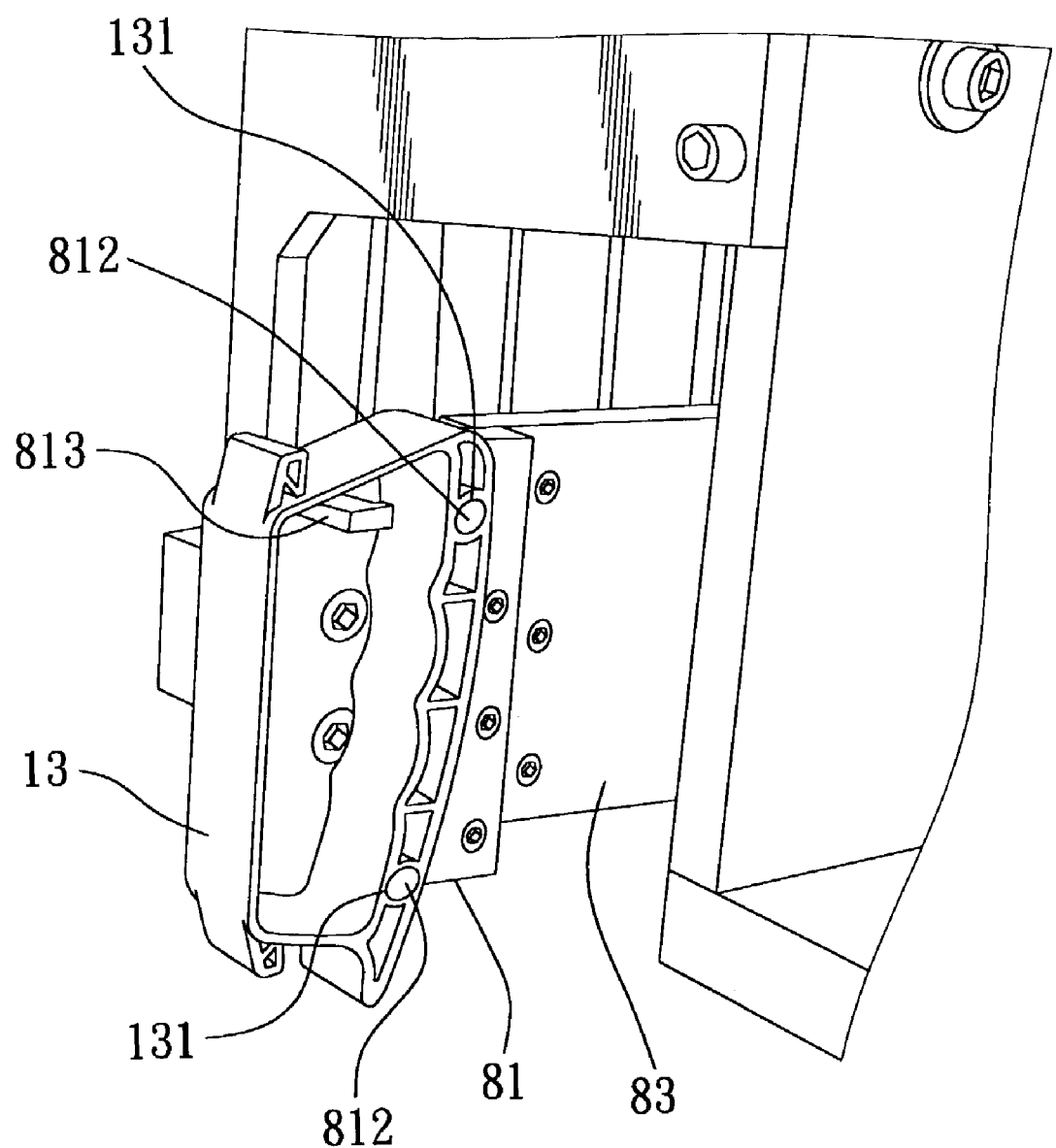
FIG. 11 is a fragmentary perspective view illustrating the pick-up unit with the handle part clamped thereon.

2. Picking Up:

With further reference to FIG. 10, when the handle parts 13, 13' are respectively disposed in the first and second feed receivers 71, 72, the first and second pick-up elements 81, 82 are flush with and confront the first and second feed receivers 71, 72, respectively. Moreover, the piston drive rod 311 of the first power source 31 will be retracted to bring the entire elevator unit 40 to displace toward the rear end of the base 20. At this time, referring to FIG. 11, the upper and lower pins 812 on the first pick-up element 81 are extended into two insert holes 131 in the handle part 13, and the clamp piece 813 on the first pick-up element 81 can clamp the handle part 13 against the upper pin 812. The handle part 13' is held on the second pick-up element 82 in the same manner.

Referring once again to FIG. 11, in combination with FIG. 4, the piston drive rod 311 of the first power source 31 is extended to bring the entire elevator unit 40 to displace toward the front end of the base 20 so that the first and second pick-up elements 81, 82 of the pick-up unit 80 that is secured to the elevator seat 45 can carry the handle parts 13, 13' away from the first and second feed receivers 71, 72.

3. Insertion

Figure 12:
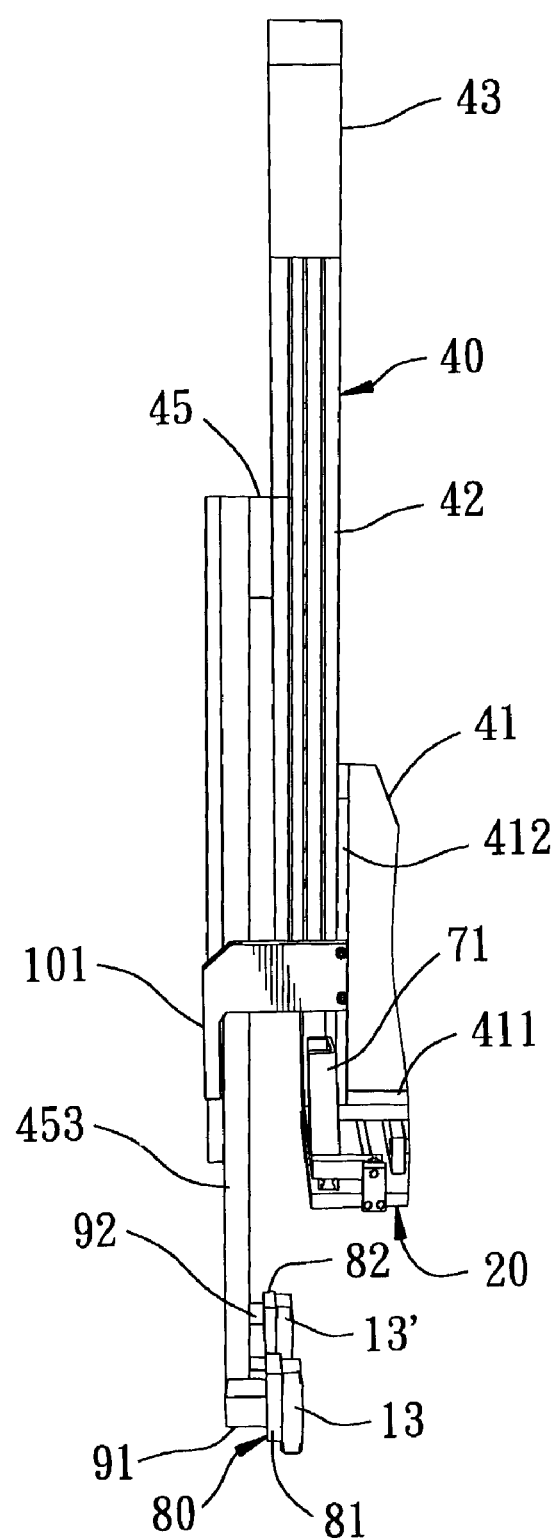
FIG. 12 is a fragmentary side view illustrating the pick-up unit in a lowered state.

Referring to FIG. 12, after the first and second pick-up elements 81, 82 have picked up the handle parts 13, 13', the motor 43 of the elevator unit 40 is actuated to lower the elevator seat 45 to a predetermined position, thereby lowering the pick-up unit 80 to a position below the base 20.

Figure 13:
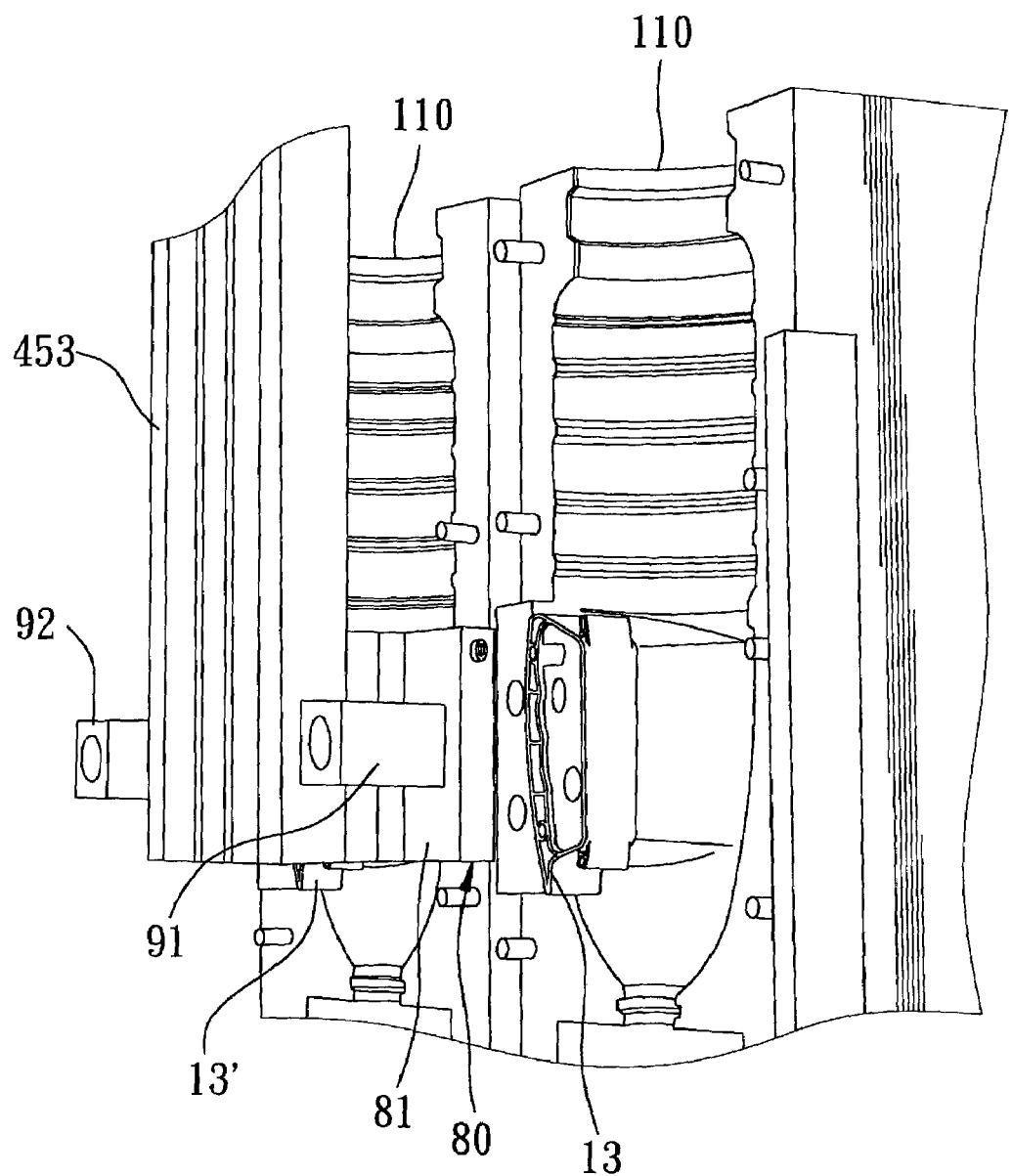
FIG. 13 is a fragmentary perspective view illustrating feeding of the handle part into a blow molding mold.

Referring to FIG. 13, when the pick-up unit 80 has been lowered to a position where the pick-up unit 80 is flush with two blow-molding members 110 of a blow molding machine, the piston drive rod 311 of the first power source 31 is retracted once again so that the elevator unit 40 brings the pick-up unit 80 and the handle parts 13, 13' to displace toward the rear end of the base 20 such that the handle parts 13, 13' on the pick-up unit 80 are respectively disposed within the blow-molding members 110 at predetermined positions.

4. Releasing

Figure 14:
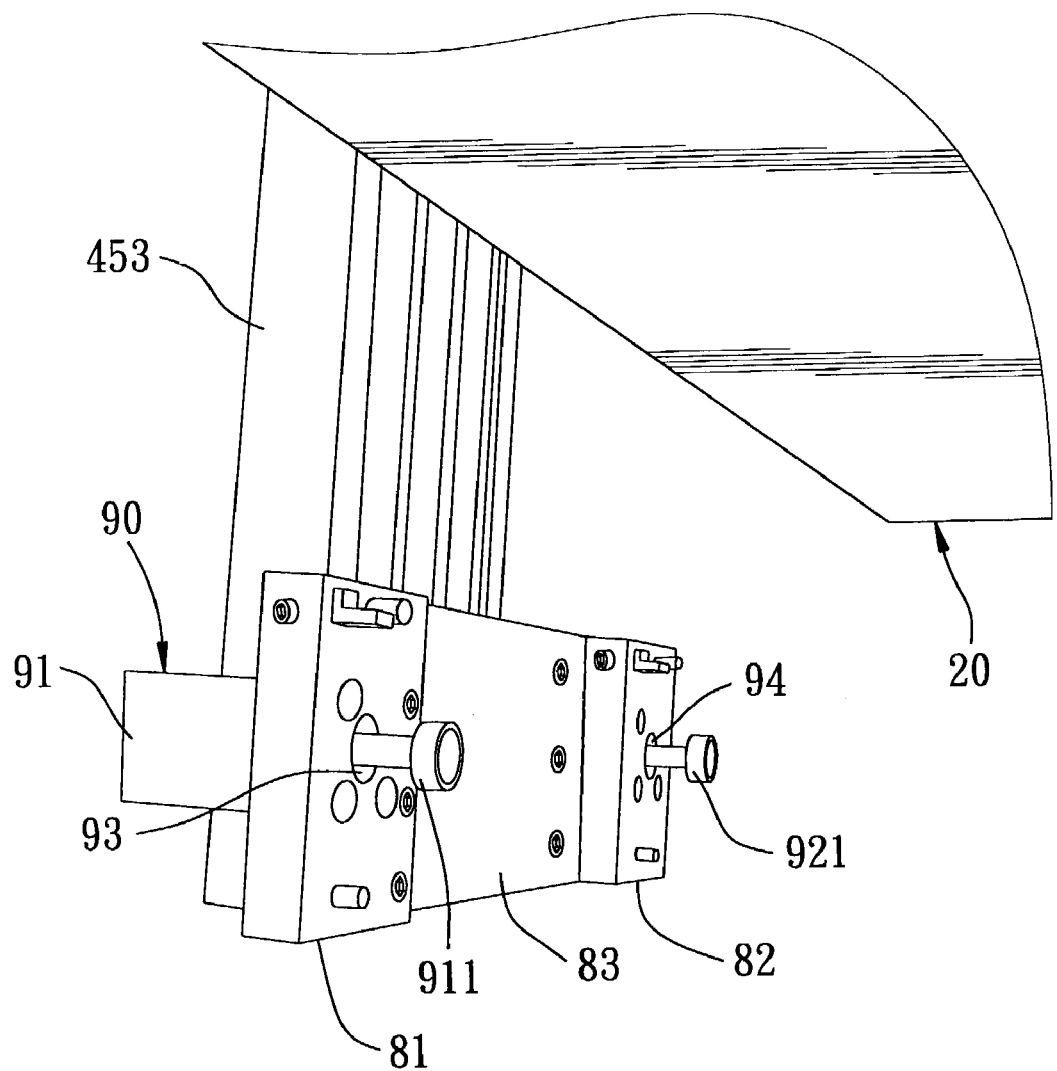
FIG. 14 is a fragmentary perspective view illustrating a release unit in a state of use.
Figure 15:
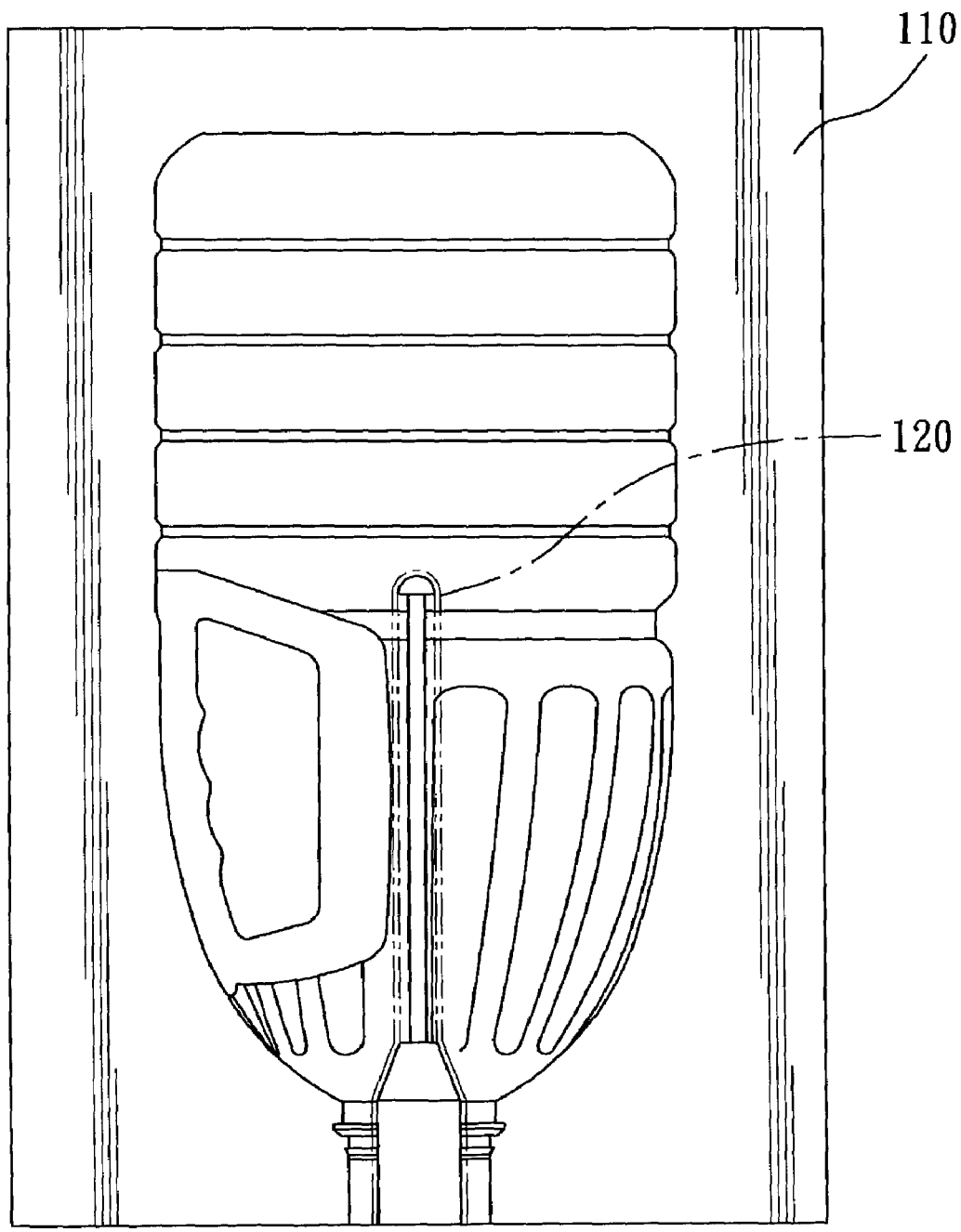
FIG. 15 is a schematic plan view illustrating a bottle blank disposed in the blow molding mold.
Figure 16:
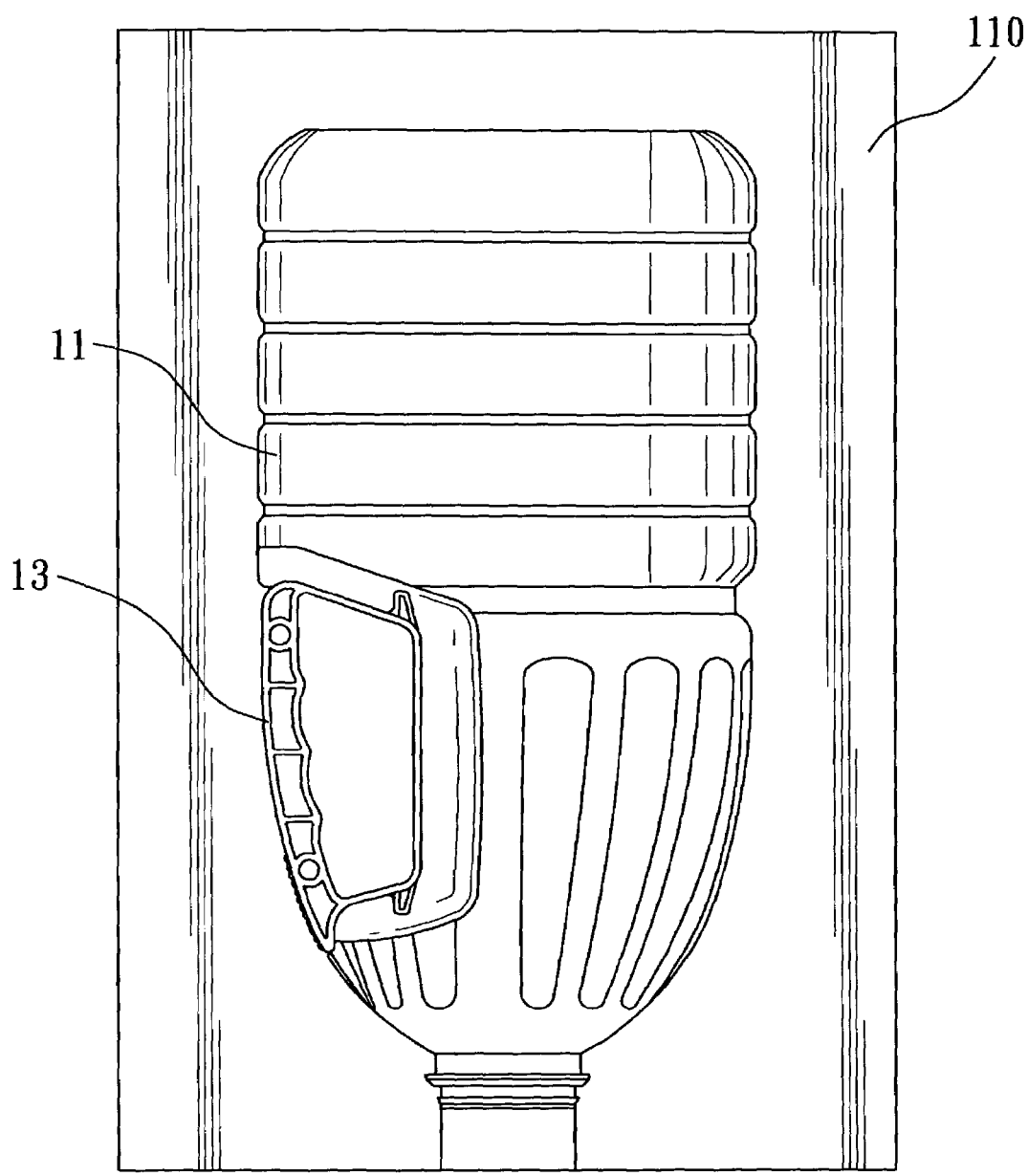
FIG. 16 is another schematic plan view illustrating a bottle formed from the bottle blank and having the handle part coupled therewith.

Referring to FIGS. 13 and 14, after the handle parts 13, 13' are located at the predetermined positions, the plungers 911, 921 of the first and second hydraulic cylinders 91, 92 are extended outwardly of the ejector holes 93, 94 to push the handle parts 13, 13' away from the first and second pick-up elements 81, 82, respectively. The piston drive rod 311 of the first power source 31 is then extended to move the elevator unit 40, the pick-up unit 80 and the release unit 90 to displace toward the front end of the base 20 so that the first and second handle parts 13, 13' are left within the blow-molding members 110 for subsequent coupling with two bottle bodies 11 during blow molding of the bottle bodies 11 from bottle blanks 120 in a single blow molding operation (see FIGS. 15 and 16).

While the apparatus of the present invention has been illustrated hereinabove to be capable of inserting two handle parts 13 into two bottle bodies 11 in one operation so as to increase productivity, it is noted that the present invention can be modified for inserting a single handle part into a bottle body in one operation by eliminating the second drive unit 60, the second feed receiver 72, the second pick-up element 82, and the second hydraulic cylinder 92.

In the present invention, as the handle parts 13 can be automatically fed into the blow molding members 110 for coupling with the bottle bodies 11 during blow molding of the bottle bodies 11, safety and productivity can be considerably enhanced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An apparatus for inserting a handle part into a mold for blow molding a bottle, comprising:
    a pick-up unit adapted for picking up the handle part, said pick-up unit including a vertical backing plate, a clamping unit projecting substantially horizontally from said backing plate and adapted to clamp therebetween a portion of the handle part, and an ejector hole formed in said backing plate; and
    a release unit disposed at one side of said backing plate opposite to said clamping unit, said release unit including a plunger movable through said ejector hole so as to be adapted to push the handle part away from said clamping unit;
    wherein said clamping unit includes an upper pin and a lower pin, both of which project from said backing plate so as to be adapted to extend into the handle part, and a clamp piece projecting from said backing plate adjacent to said upper pin so as to be adapted to clamp a portion of the handle part against said upper pin, said ejector hole being disposed between said upper and lower pins.

2. The apparatus as claimed in claim 1, wherein said release unit includes a hydraulic cylinder mounted on said backing plate, said plunger being connected to and operated hydraulically by said hydraulic cylinder.

3. An apparatus for inserting a handle part into a mold for blow molding a bottle, comprising:
    a pick-up unit adapted for picking up the handle part, said pick-up unit including a vertical backing plate, a clamping unit projecting substantially horizontally from said backing plate and adapted to clamp therebetween a portion of the handle part, and an ejector hole formed in said backing plate;
    a release unit disposed at one side of said backing plate opposite to said clamping unit, said release unit including a plunger movable through said ejector hole so as to be adapted to push the handle part away from said clamping unit;
    a base; and
    a feed mechanism mounted on said base and adapted to feed the handle part to said pick-up unit, said feed mechanism comprising a feed channel mounted vertically on said base and adapted to receive and permit the handle part to move downward therein, and a carrier mounted movably on said base for moving horizontally between said feed channel and said pick-up unit and adapted to transfer the handle part from said feed channel to said pick-up unit.

4. The apparatus as claimed in claim 3, further comprising a moving mechanism mounted on said base to move said pick-up unit toward and away from said carrier.

5. The apparatus as claimed in claim 4, wherein said moving mechanism comprises:
a first drive unit which is mounted on said base and which includes a first power source and a first moving body driven by said first power source along a first horizontal direction; and
an elevator unit which includes an upright support mounted on said first moving body, and an elevator seat mounted movably on said upright support for moving upward and downward relative to said upright support, said pick-up unit being secured to said elevator seat.

6. The apparatus as claimed in claim 5, wherein said elevator unit further includes a motor disposed on said upright support, and a screw rod rotated by said motor and connected to said elevator seat for moving said elevator seat.

7. The apparatus as claimed in claim 5, wherein said feed mechanism further includes first and second stops disposed across said feed channel, vertically spaced apart from each other, and adapted to control downward movement of the handle part.

8. The apparatus as claimed in claim 5, wherein said feed mechanism further comprises a second drive unit which includes a second power source mounted on said base, and a second moving body driven by said second power source to move along a second horizontal direction perpendicular to said first horizontal direction, said carrier including a feed receiver mounted on said second moving body and movable to and below said feed channel so as to be adapted to receive the handle part delivered from said feed channel.

9. The apparatus as claimed in claim 8, wherein said feed receiver includes a receiving space adapted to receive the handle part delivered from said feed channel, a top entrance to be aligned with said feed channel when said feed receiver is moved below said feed channel, and a side exit opening to be aligned with said pick-up unit, said top entrance and said side exit opening being communicated with said receiving space.

10. The apparatus as claimed in claim 8, wherein said second drive unit further includes a slide rail mounted on said base, and a slide block slidably mounted on said slide rail, said second moving body being connected to said slide block.

11. The apparatus as claimed in claim 10, further comprising a guide unit which includes first and second brackets mounted on said first moving body on two sides of said elevator seat, and two guide rollers connected respectively to said first and second brackets and abutting against said elevator seat.

12. An apparatus for inserting a handle part into a mold for blow molding a bottle, comprising:
a pick-up unit adapted for picking up the handle part, said pick-up unit including a vertical backing plate, a clamping unit projecting substantially horizontally from said backing plate and adapted to clamp therebetween a portion of the handle part, and an ejector hole formed in said backing plate;
a release unit disposed at one side of said backing plate opposite to said clamping unit, said release unit including a plunger movable through said ejector hole so as to be adapted to push the handle part away from said clamping unit;
a base; and
a feed mechanism mounted on said base and adapted to feed the handle part to said pick-up unit, said feed mechanism comprising a feed channel mounted on said base and adapted to permit the handle part to move downward thereinside, and a feed receiver disposed between said feed channel and said pick-up unit and adapted to transfer the handle part from said feed channel to said pick-up unit, said feed receiver being movable to and below said feed channel so as to be adapted to receive the handle part from said feed channel.

13. The apparatus as claimed in claim 12, wherein said feed receiver has a receiving space, a top entrance to be aligned with said feed channel, and a side exit opening to be aligned with said backing plate of said pick-up unit, said top entrance and said side exit opening being communicated with said receiving space.

* * * * *